(12) United States Patent
Klein et al.

(10) Patent No.: US 10,794,500 B2
(45) Date of Patent: Oct. 6, 2020

(54) FLUID SWITCH-OVER DEVICE

(71) Applicant: Hansgrohe SE, Schiltach (DE)

(72) Inventors: Christiane Klein, Cologne (DE); Fabian Melle, Durbach (DE)

(73) Assignee: Hansgrohe SE, Schiltach (DE)

( * ) Notice: Subject to any disclaimer, the term of this patent is extended or adjusted under 35 U.S.C. 154(b) by 49 days.

(21) Appl. No.: 16/131,024

(22) Filed: Sep. 13, 2018

(65) Prior Publication Data
US 2019/0085989 A1 Mar. 21, 2019

(30) Foreign Application Priority Data

Sep. 15, 2017 (DE) .................. 10 2017 216 413

(51) Int. Cl.
| F16K 11/074 | (2006.01) |
| F16K 11/078 | (2006.01) |
| F16K 31/524 | (2006.01) |
| F16K 11/076 | (2006.01) |
| F16K 31/56 | (2006.01) |
| B05B 1/16 | (2006.01) |

(52) U.S. Cl.
CPC .......... *F16K 11/074* (2013.01); *F16K 11/076* (2013.01); *F16K 11/078* (2013.01);
(Continued)

(58) Field of Classification Search
None
See application file for complete search history.

(56) References Cited

U.S. PATENT DOCUMENTS 3,459,208 A * 8/1969 Clyde .................. F16K 31/528
137/119.03
3,762,664 A * 10/1973 Loveless ................ B65G 51/24
406/182
(Continued)

FOREIGN PATENT DOCUMENTS

| CN | 101922570 A | 12/2010 |
| CN | 102720861 A | 10/2012 |

(Continued)

OTHER PUBLICATIONS

Letter Exam Report issued by the German Patent Office, dated Jun. 25, 2018, for German priority Application No. 10 2017 216 413.1; 6 pages.

(Continued)

*Primary Examiner* — John Fox
(74) *Attorney, Agent, or Firm* — Faegre Drinker Biddle & Reath LLP

(57) ABSTRACT

A fluid switch-over device of the type that may be used in sanitary shower devices, the fluid switch-over device including a housing body which includes a fluid inlet channel and a plurality of fluid outlet channels arranged fluidically in parallel, a switch-over body which includes a fluid inlet, at least one fluid outlet and a fluid duct from the fluid inlet to the fluid outlet and is disposed within the housing body to be translationally movable axially parallel and rotationally movable in a combined manner in relation to a longitudinal axis between at least two different operating positions. The switch-over body in each of the different operating positions is in fluid connection with the fluid inlet channel via its fluid inlet and differentially unblocks or blocks at least partially a fluid connection of its fluid outlet to the respective fluid outlet channel. An actuation unit for actuating the switch-over body includes an operating element disposed on the housing body to be user-operable.

19 Claims, 4 Drawing Sheets

(52) U.S. Cl.
CPC ...... *F16K 31/52483* (2013.01); *F16K 31/563* (2013.01); *B05B 1/1609* (2013.01); *E03C 2201/30* (2013.01)

(56) References Cited

U.S. PATENT DOCUMENTS

| | | | |
|---|---|---|---|
| 4,109,670 A * | 8/1978 | Slagel | F16K 11/022 |
| | | | 137/119.03 |
| 4,133,418 A * | 1/1979 | Van Bilderbeek | E21B 23/002 |
| | | | 137/874 |
| 6,276,659 B1 | 8/2001 | Wang | |
| 7,080,790 B2 | 7/2006 | Lorch | |
| 8,474,482 B2 | 7/2013 | Melle | |
| 9,115,819 B2 | 8/2015 | Lange | |
| 2006/0289818 A1* | 12/2006 | Hodel | F16K 31/52416 |
| | | | 251/100 |
| 2010/0193721 A1* | 8/2010 | Melle | F16K 31/563 |
| | | | 251/213 |
| 2013/0118620 A1 | 5/2013 | Zhou et al. | |

FOREIGN PATENT DOCUMENTS

| | | |
|---|---|---|
| CN | 103470809 A | 12/2013 |
| CN | 104279355 A | 1/2015 |
| DE | 1750380 A1 | 2/1971 |
| DE | 10137611 C1 | 4/2003 |
| DE | 102009008194 B4 | 7/2011 |
| DE | 102013213275 A1 | 1/2015 |
| DE | 102013224054 B3 | 1/2015 |
| EP | 1281899 A2 | 2/2003 |
| EP | 3135970 A1 | 3/2017 |
| FR | 2623593 A1 | 5/1989 |
| RU | 2317460 C2 | 2/2008 |
| RU | 2602711 C2 | 11/2016 |

OTHER PUBLICATIONS

Search Report issued by the European Patent Office, Munich, Germany, dated Feb. 18, 2019 for European Patent Application No. 18193570.1.

Decision to Grant issued by the Federal Service For Intellectual Property, Patents and Trademarks (ROSPATENT), dated Jun. 6, 2019, for Russian Patent Application No. 2018131936/06(052099).

First Office Action with English translation issued by the National Intellectual Property Administration, P.R. China, dated Aug. 6, 2019, for Chinese Patent Application No. 201811074257.6.

* cited by examiner

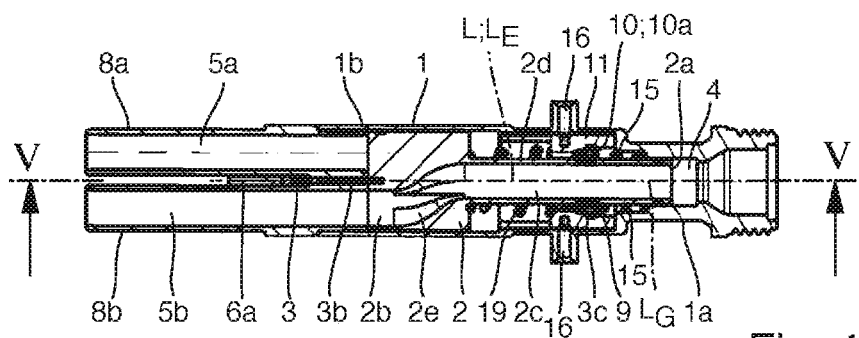
Fig. 4
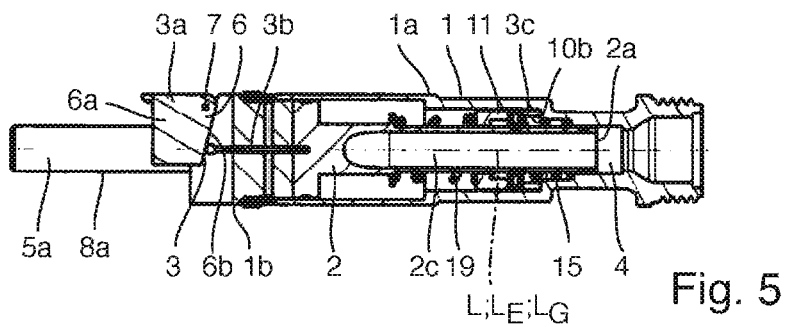
Fig. 5
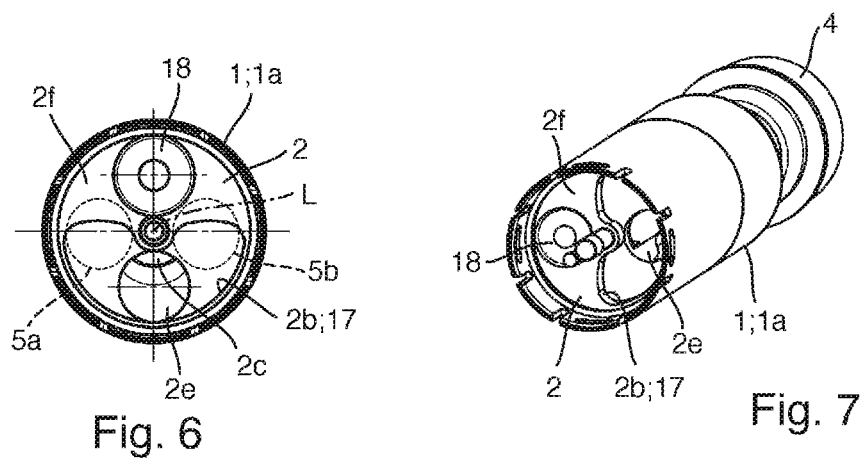
Fig. 6
Fig. 7

FLUID SWITCH-OVER DEVICE

CROSS-REFERENCE TO RELATED APPLICATION

This application claims priority to German Patent Application No. DE 10 2017 216 413.1, filed on Sep. 15, 2017, the disclosure of which is expressly incorporated herein by reference.

BACKGROUND AND SUMMARY OF THE DISCLOSURE

The invention relates to a fluid switch-over device, comprising a housing body, which includes a fluid inlet channel and a plurality of fluid outlet channels arranged fluidically in parallel, a switch-over body, which includes a fluid inlet, at least one fluid outlet and a fluid duct from the fluid inlet to the fluid outlet and is disposed within the housing body to be translationally movable axially parallel and rotationally movable in a combined manner in relation to a longitudinal axis between at least two different operating positions, and an actuation unit for actuating the switch-over body. In the different operating positions, the switch-over body unblocks or shuts off a fluid connection of its fluid outlet to the respective fluid outlet channel in different ways, wherein unblocking or shutting off should be understood to mean that an effective through flow cross section belonging to the relevant fluid connection is unblocked or shut off at least partially, i.e. completely or only partially. This also includes the case where at least two of the fluid outlet channels can be simultaneously at least partially opened in at least one of the operating positions, i.e. where the fluid connection of the fluid outlet channels to the fluid inlet channel is in each case at least partially enabled via the switch-over body. Here, the switch-over body remains in fluid connection with the fluid inlet channel in each of these operating positions via its fluid inlet. The actuation unit includes a user-operable operating element arranged on the housing body.

Fluid switch-over devices of this kind can be used, for example, for sanitary water discharge faucets in order to enable the user to switch over between a plurality of water outlets arranged fluidically in parallel, with the result that water supplied emerges in a controllable manner, e.g. from just one or from a desired combination or from none of the available water outlets. This can be used, in the case of sanitary shower devices, for example, to set different types of shower jets or, in the case of bathtub discharge faucets, to switch between a bathtub outlet and a shower outlet.

The combined mobility of the switch-over body in translation parallel to a longitudinal axis and in rotation about the longitudinal axis often has advantages over alternative arrangements, in which the switch-over body is moved only in rotation or only in translation. To achieve this combined axial and rotary movement, the use of sliding guides resembling a ballpoint pen mechanism for the switch-over body is known, for example.

Thus, by means of this combined capacity for movement, the switch-over body with its fluid outlet can, for example, initially be raised axially from a housing body region containing the fluid outlet channels, before being rotated, whereby unwanted friction effects on sealing surfaces of the kind which can occur in the case of an alternative, simple rotation can be avoided. The housing body region can be implemented, for example, as a valve seat surface for the switch-over body, which then acts as a movable valve body. After the axial lift-off, the switch-over body can be rotated and moved back again axially in the new rotated operating position in order to form a new overlap configuration with the fluid outlet channels by means of its at least one fluid outlet, switching over the fluid, and in this way to distribute the fluid fed to the fluid switch-over device via the fluid inlet channel in a different way between the fluid outlet channels thereof, i.e. to unblock or shut off the fluid connection of the at least one fluid outlet of the switch-over body to the respective fluid outlet channel in a correspondingly different way.

Here, it is possible, e.g. for the mentioned configuration of the relevant housing body region as a valve seat surface, for the fluid outlet channels of the housing body to be situated on the inlet side in a plane in which the at least one fluid outlet of the switch-over body is correspondingly situated when the switch-over body is in the respective operating position. In the alternative, conventional arrangements with a switch-over body which is moved only in translation, this is not possible since the switch-over body adopts correspondingly axially offset positions in its different operating positions, with the result that different configurations are required in order to control the fluid connection from the fluid inlet channel to the fluid outlet channels of the housing body in the desired manner. Moreover, the conventional arrangements of this type often have relatively unfavorable flow conditions, which can lead to unwanted flow noises and flow resistances.

For fluid switch-over devices of the type stated at the outset, there is a known practice of using, as a switch-over body, a disc-shaped valve body which has one or more through openings and/or covering regions and, in its operating positions, comes into contact in the fluid flow direction with a housing body region which acts as a valve seat surface for the disc-shaped valve body and from which the fluid inlet channels lead away. Fluid switch-over devices of this kind are disclosed in Patent Publications DE 10 2009 008 194 B4 and DE 10 2013 224 054 B3, in which sliding guides of the ballpoint pen mechanism type are also used for the combined axial and rotary movement of the valve body.

In the case of these conventional switch-over devices, to perform a respective switch-over operation the disc-shaped valve body is first of all moved away axially from the valve seat counter to the fluid flow direction and is then brought back onto the valve seat in a rotated position, wherein the rotation can be combined with the lifting axial movement and/or the axial return movement or can take place after the axial lift-off movement and before the axial return movement. This means that, during the operation of the fluid switch-over device, when there is fluid pressure due to the fluid supplied, the disc-shaped valve body must be moved away from the valve seat against the fluid pressure, while the fluid pressure assists the return movement onto the valve seat. This results in a pressure-dependent switch-over or switching operation with actuating forces that differ in accordance with the fluid pressure for lifting the valve body from the valve seat, on the one hand, and for returning it to the valve seat, on the other hand.

It is an object of the invention to provide a fluid switch-over device of the type stated at the outset which can be implemented with a relatively favorable through flow characteristic and/or which allows relatively functionally advantageous switch-over operations, even when operating under an applied fluid pressure.

The invention achieves this and other objects by providing a fluid switch-over device which includes a housing body which includes a fluid inlet channel and a plurality of fluid outlet channels arranged fluidically in parallel, a switch-over body which includes a fluid inlet, at least one fluid outlet and a fluid duct from the fluid inlet to the fluid outlet and is disposed within the housing body to be translationally movable axially parallel and rotationally movable in a combined manner in relation to a longitudinal axis (L) between at least two different operating positions. The switch-over body in each of the different operating positions is in fluid connection to the fluid inlet channel via its fluid inlet and differentially (selectively) unblocks or blocks at least partially a fluid connection of its fluid outlet to the respective fluid outlet channel. An actuation unit for actuating the switch-over body includes an operating element disposed on the housing body to be user-operable. The switch-over body includes an inlet nozzle guided in a fluid-tight manner within the fluid inlet channel for axial and rotational movement, the inlet nozzle constituting the fluid inlet on an inlet side.

The switch-over body of this fluid switch-over device includes an inlet nozzle guided in a fluid-tight manner within the fluid inlet channel for axial and rotational movement, the inlet nozzle constituting the fluid inlet on an inlet side. This allows an advantageous through flow characteristic of the fluid switch-over device and advantageous switch-over operations, i.e. switching operations, which are substantially independent of the prevailing fluid pressure or are at least significantly less dependent on the pressure than the above-mentioned prior art. This is because the fluid-tight guidance of the inlet nozzle within the fluid inlet channel for axial and rotational movement makes it possible for the switch-over body and hence also the fluid switch-over device overall to maintain a substantially uniform through flow behavior, irrespective of whether it is moving at that precise moment between two of its operating positions to carry out a switching operation, and irrespective of the operating position of the body in which it is situated when no switching operation is taking place. Moreover, the effective through flow cross section of the switch-over body, at least in the inlet region thereof, can be held substantially constant at all times by virtue of the fact that the switch-over body is situated fluid-tightly in the fluid inlet channel by means of its inlet nozzle, both in its operating positions and during switching operations. Moreover, the fluid pressure acting on the switch-over body can be held at a minimum, and the movement of the switch-over body out of its respective operating position can be configured in such a way that no significant fluid pressure forces have to be overcome.

As a further development of the invention, the fluid inlet of the switch-over body has a passage cross section which is conform to that of the fluid inlet channel. This allows a further optimization of the flow behavior of the fluid switch-over device and of its switching characteristic, which is substantially independent of the fluid pressure.

As a further development of the invention, the switch-over body is rotatably movable about a central longitudinal axis of the inlet nozzle as a rotational axis, and the fluid outlet is disposed offset in relation to the rotational axis. This allows structurally simple rotary guidance of the inlet nozzle by the fluid inlet channel surrounding the nozzle, and, by virtue of the offsetting of the rotational axes, the fluid outlet can be brought very simply into fluid connection selectively with the fluid inlet channels, for which purpose it is sufficient, for example, to dispose the fluid inlet channels in a manner offset in relation to this rotational axis with a mutual spacing in respect of the direction of rotation.

As a further development of the invention, the actuation unit includes an actuation pin guided within the housing body for axial movement and a sliding guide mechanism for rotating the switch-over body. This enables the switch-over body to be moved in a combined translational and rotary manner as desired in a structurally advantageous manner.

As a development of the invention, the sliding guide mechanism includes, for this purpose, a sliding cam on the switch-over body and a sliding track on the housing body cooperating with the sliding cam. In this embodiment, the actuation pin can be used to bring about the axial translational movement of the switch-over body, and the desired rotation of the switch-over body can be brought about by the associated movement of the sliding cam along the sliding track.

In another development of the invention, the sliding guide mechanism includes a counter sliding element that is held elastically resilient, axially movable and rotationally fixed on the housing body, the counter sliding element having a beveled cam with a bevel surface constituting an initial section of the sliding track for the sliding cam. In this advantageous embodiment of the sliding guide, the counter sliding element can initially give way elastically to the axial movement of the sliding cam in order then to exert an elastic return pressure with the bevel surface of the beveled cam which initiates the rotary movement of the sliding cam and hence of the switch-over body.

As a development of the invention, the sliding guide mechanism includes a guiding sleeve of the housing body, with the inlet nozzle of the switch-over body passing through the sleeve. The guiding sleeve has an axial groove and a bevel surface adjoining thereto in rotational direction as component parts of the sliding track. This represents a structurally advantageous sliding guide that can be produced with a relatively low outlay, wherein the guiding sleeve can be produced integrally with the housing body or as a self-contained component part which is fixed on the remainder of the housing body. The axial groove can be used to guide the sliding cam and hence the switch-over body during the axial movement, and the bevel surface of the guiding sleeve adjoining in rotational direction can initiate a combined axial and rotary movement of the switch-over body.

As a further development of the invention, the fluid switch-over device includes an elastic bias element to bias the switch-over body axially elastically into its respective operating position. This stabilizes the position of the switch-over body in the respective operating position thereof. To initiate a respective switch-over operation from the instantaneous operating position into a desired next operating position, the switch-over body is moved out of its instantaneous operating position by means of the actuation unit against the biasing force of the elastic bias element.

As a further development of the invention, the housing body includes a tubular outer housing, and the operating element includes an operating button pivotable about a pivot axis extending transversely in relation to a longitudinal axis of the tubular outer housing. The housing body can be installed well in corresponding sanitary fittings by means of its tubular outer housing, and the user can conveniently initiate the fluid switch-over by means of the operating button. This embodiment can be advantageously suitable for sanitary shower devices, for example.

As a further development of the invention, the fluid switch-over device is configured for installation into a sanitary water discharge faucet, wherein the sanitary water discharge faucet can be a shower handle or a shower head of a sanitary shower device, for example.

Additional features and advantages of the present invention will become apparent to those skilled in the art upon consideration of the following detailed descriptions of the illustrative embodiment best exemplifying the best mode of carrying out the invention as presently perceived.

BRIEF DESCRIPTION OF THE DRAWINGS

Advantageous embodiments of the invention are illustrated in the drawings and are described below. In the drawings:

FIG. 4 shows a section along a line IV-IV in FIG. 3, FIG. 5 shows a section along a line V-V in FIG. 4, FIG. 6 shows a plan view of a fluid outlet surface of the switch-over body in a version of the fluid switch-over device according to FIG. 1, FIG. 7 shows a perspective view of an inlet-side housing part of the switch-over device in FIG. 6 with the switch-over body inserted.

DETAILED DESCRIPTION OF THE DRAWINGS

Figure 1:
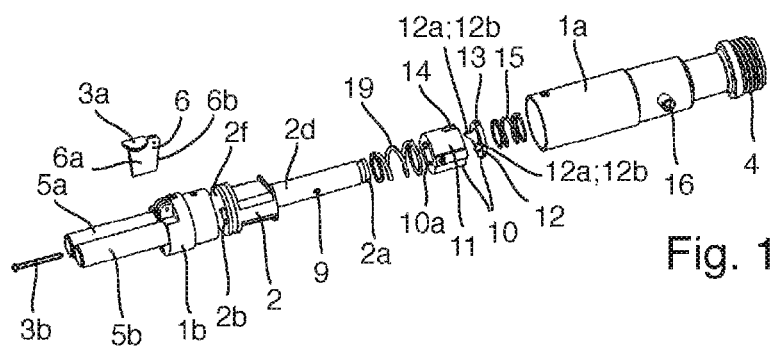
FIG. 1 shows a perspective exploded view of a fluid switch-over device with a movable switch-over body and two fluid outlet channels.
Figure 2:
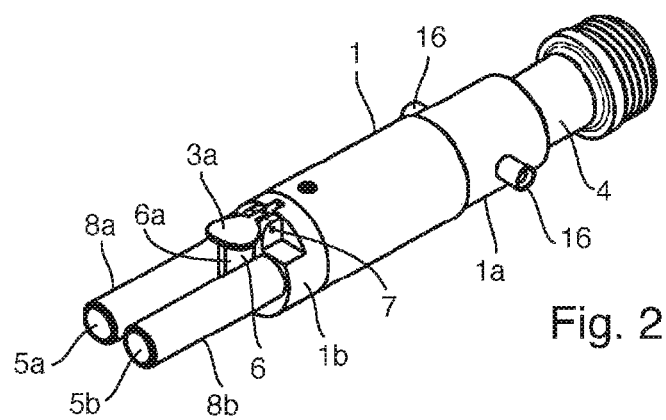
FIG. 2 shows a perspective view of the fluid switch-over device in FIG. 1.
Figure 3:
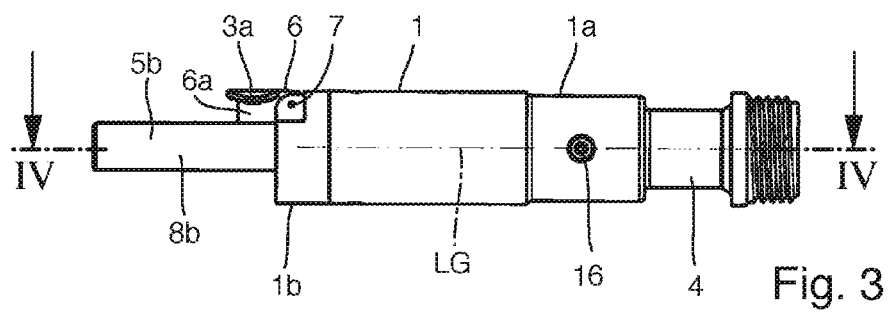
FIG. 3 shows a side view of the fluid switch-over device in FIG. 1.
Figure 8:
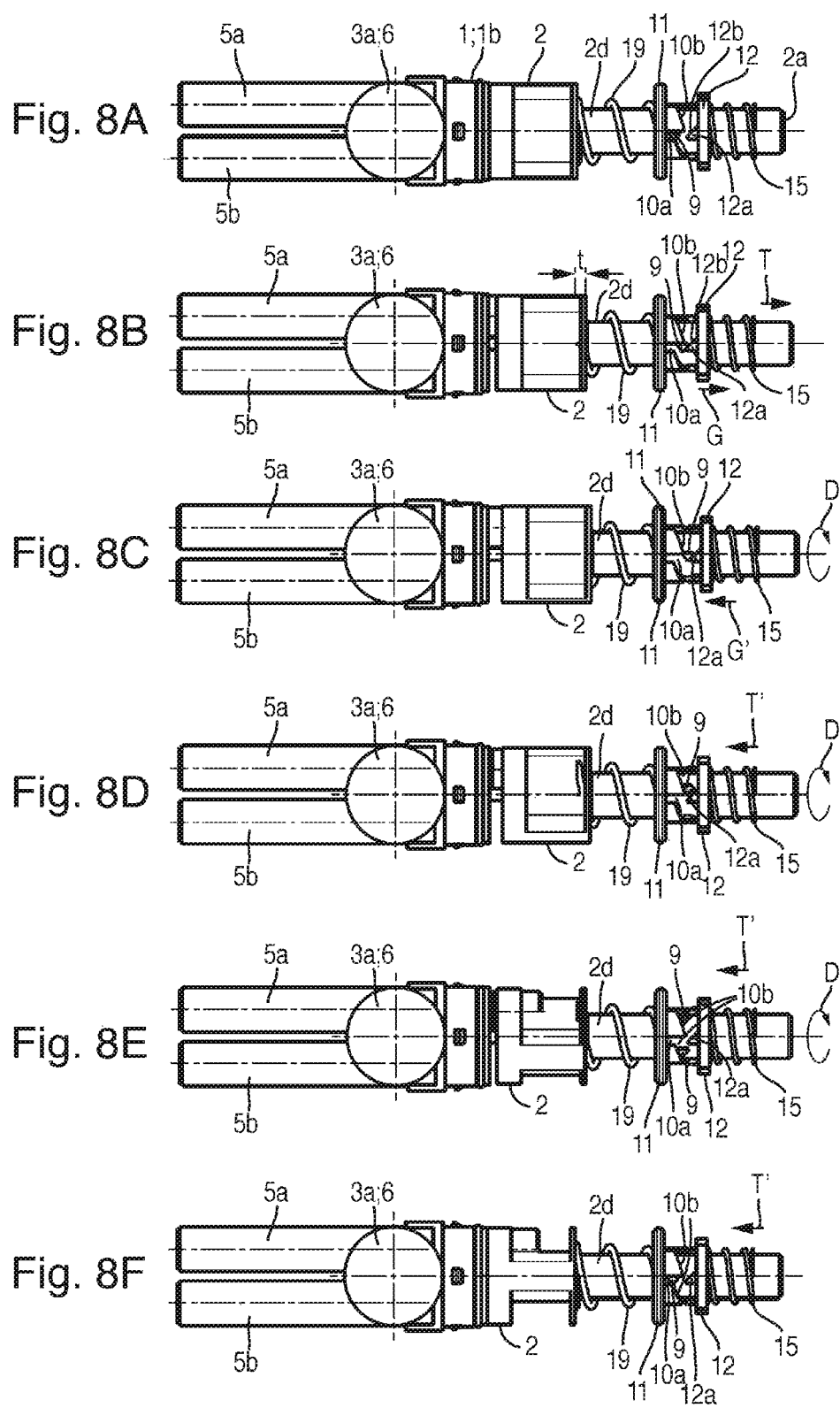
FIGS. 8A to 8F show plan views of a fluid switch-over device of the kind shown in FIGS. 1 to 7 with the inlet-side housing part removed, in various switch-over body positions during a switch-over operation.

The embodiments of the invention described herein are not intended to be exhaustive or to limit the invention to precise forms disclosed. Rather, the embodiments selected for description have been chosen to enable one skilled in the art to practice the invention.

An advantageous embodiment of the fluid switch-over device according to the invention, having a housing body 1, a switch-over body 2 and an actuation unit 3, is illustrated in FIGS. 1 to 5. The housing body 1 has a fluid inlet configuration with a fluid inlet channel 4 and a fluid outlet configuration with a plurality of fluid outlet channels 5a, 5b arranged fluidically in parallel. The actuation unit 3 includes an operating element 3a disposed on the housing body 1 in a manner which enables it to be operated by the user.

The switch-over body has a fluid inlet 2a, at least one fluid outlet 2b and a fluid duct 2c, i.e. a fluid flow path, from the fluid inlet 2a to the fluid outlet 2b and is disposed in the housing body 1 for a combined axially parallel translational movement and rotary movement between at least two different operating positions in relation to a longitudinal axis L. In this case, the switch-over body 2 is in each case in fluid connection with the fluid inlet channel 4 via its fluid inlet 2a in the different operating positions, while it unblocks or shuts off a fluid connection of its fluid outlet 2b to the respective fluid outlet channel 5a, 5b to different extents and at least partially. In other words, when the switch-over body 2 is switched over from a current operating position into a subsequent operating position, the body remains in fluid connection via its fluid inlet 2a with the fluid inlet channel 4, while its fluid outlet 2b is switched over to a different unblock/shut-off configuration for the fluid outlet channels 5a, 5b. The switch-over body 2 has an inlet nozzle 2d, which is guided fluid-tightly in the fluid inlet channel 4 for axial and rotary movement and which forms the fluid inlet 2a on the inlet side.

Further details of additional optional features of the fluid switch-over device according to the invention, of the kind which can be provided in corresponding embodiments individually or in any desired combination, depending on requirements and the application, will be given below.

Thus, in advantageous embodiments, the fluid inlet 2a of the switch-over body 2 has a passage cross section corresponding to that of the fluid inlet channel 4. In the example shown in FIGS. 1 to 5, this is implemented by using an interior space of circular cross section in a hollow-cylindrical part of the housing body 1 to form the fluid inlet channel 4 and by forming the inlet nozzle 2d of the switch-over body 2 as a corresponding hollow cylinder of circular outside diameter, such that it can be fitted fluid-tightly and coaxially into the fluid inlet channel 4 and is guided in an axially movable and rotatably movable manner in the fluid inlet channel 4. As a result, the switch-over body 2 remains completely in fluid connection with the fluid inlet channel 4 by means of its fluid inlet 2a in every axial and rotational position and hence also in all its different operating positions.

In corresponding embodiments of the fluid switch-over device, the switch-over body 2 is rotatably movable about a central longitudinal axis $L_E$ of the inlet nozzle as a rotational axis, and the fluid outlet 2b is arranged offset in relation to the rotational axis, as can be seen in the illustrative embodiment in FIGS. 1 to 5, wherein here, specifically, the central longitudinal axis $L_E$ of the inlet nozzle 2d coincides with the longitudinal axis L of the switch-over body 2, which, in particular, can be a central longitudinal axis.

In corresponding embodiments, as likewise implemented in the illustrative embodiment in FIGS. 1 to 5, the fluid switch-over device according to the invention has a tubular outer housing, which, in the example shown, is made up of a housing part 1a on the fluid inlet side and a housing part 1b on the fluid outlet side, wherein the two housing parts 1a, 1b can be plugged detachably into each other or connected to each other in some other way. As an alternative, the tubular outer housing can also be constructed from more than two parts, e.g. in three parts with the housing part 1a on the fluid inlet side being divided into an inlet-side part and a central sleeve part between the inlet-side part and the housing part 1b on the fluid outlet side. In the example shown, a longitudinal axis $L_G$ of the tubular outer housing 1a, 1b coincides with the longitudinal axis L of the switch-over body 2. The operating element 3a includes an operating button 6, which is pivotably movable about a pivot axis 7 extending transversely to the longitudinal axis $L_G$ of the tubular outer housing 1a, 1b. More specifically, for this purpose the operating button 6 is held on the outlet-side housing part 1b in the illustrative embodiment in FIGS. 1 to 5, wherein the operating button 6 has a wedge-shaped foot part 6a, by means of which it extends into an interspace between two tubular outlet nozzles 8a, 8b of the housing body 1, which form the fluid outlet channels 5a, 5b. This can assist the guidance of the operating button 6 for its operating pivoting movement about the pivot axis 7.

In advantageous implementations of the fluid switch-over device according to the invention, the actuation unit 3 includes an actuation pin 3b guided for axial movement in the housing body 1 and a sliding guide 3c used for the rotation of the switch-over body 2. In the illustrative embodiment in FIGS. 1 to 5, the actuation pin 3b is embodied as a pressure pin, which rests at one end against an oblique lateral edge 6b of the foot part 6a of the operating button 6 and is fixed by means of its opposite end on the switch-over body 2. In this way, the actuation pin 3b forms a pressure pin, and the operating button 6 forms a pushbutton, allowing the user, by pressing on the operating button 6, to push the actuation pin 3b and, together with the latter, the switch-over body 2, axially forwards, i.e. to the right in FIGS. 1 to 5 in the direction of the fluid inlet side of the fluid switch-over device and hence counter to a main direction of flow of the fluid flowing through the fluid switch-over device.

In the illustrative embodiment in FIGS. 1 to 5, the sliding guide 3c includes a sliding cam 9 on the switch-over body 2 and a sliding track 10, cooperating with the sliding cam 9, on the housing body 1. The sliding guide 3c is designed conventionally in the manner of a ballpoint pen mechanism of the kind which is known from the abovementioned prior art, for example. Here, the sliding guide 3c in the illustrative embodiment in FIGS. 1 to 5 includes a guiding sleeve 11, through which the inlet nozzle 2d of the switch-over body 2 extends. The guiding sleeve 11 is rigidly connected to the remainder of the housing body 1. As an alternative, it can be formed integrally with the housing body 1 is a corresponding sleeve section thereof. In the example shown, the guiding sleeve 11 is pushed into the inlet-side housing part 1a and is fixed therein by means of fixing screws, which can be screwed into transverse holes 16 in the housing body 1. The sliding track 10 is composed of an axial groove 10a and of a bevel surface 10b adjoining the latter in the direction of rotation, wherein the axial groove 10a can be formed on the inside of the guiding sleeve 11 and the bevel surface 10b can be formed on a face side of the guiding sleeve 11, for example, and, in the present case, the term "axial groove" also includes the possibility of an axial slot.

Furthermore, the sliding guide 3c in the example in FIGS. 1 to 5 includes a counter sliding element 12, which is held elastically resilient, axially movable and rotationally fixed on the housing body 1 and has a bevel surface cam 12a, which, with a bevel surface 12b, forms an initial section of the sliding track 10 for the sliding cam 9. More specifically, for this purpose the counter sliding element 12 in the example shown is of annular design and is guided by means of a radially projecting web 13 in an axial groove or axial slot 14 of the guiding sleeve 11 and is supported axially via a helical spring 15 on the housing body 1, for which purpose the body has a suitable annular shoulder on the inside of its tubular housing part 1a. Depending on requirements, the sliding guide 3c includes one or more, e.g. two, three or four, sliding cams 9, which are arranged on the circumference of the inlet nozzle 2d of the switch-over body 2, and associated axial grooves 10a for the guidance thereof on the inside of the guiding sleeve 11 as well as bevel surface cams 12a with a respective bevel surface 12b, wherein the bevel surface cam or cams 12a projects/project axially from an annular main body of the counter sliding element 12.

The switch-over body 2 is widened in a foot region axially adjoining its inlet nozzle 2d. In this foot region, the fluid duct 2c makes a transition by means of a correspondingly bent flow path section 2e from the central course in the inlet nozzle 2d to the fluid outlet 2b, which is offset eccentrically in relation to the longitudinal axis L and is here formed by an outlet opening of circular cross section. On its inlet side, the outlet-side housing part 1b has a flat surface, which acts as a valve seat surface, against which the switch-over body 2 comes to rest by means of a flat outlet surface 2f having the fluid outlet 2b and in which the two fluid outlet channels 5a, 5b open with their inlet side eccentrically offset in a manner corresponding to the fluid outlet 2b at a rotation angle spacing of 180°.

In the operating position of the switch-over body 2, as shown in FIGS. 1 to 5, the switch-over body 2 unblocks the fluid connection of its fluid outlet 2b to the fluid outlet channel 5b, while it shuts off the fluid connection to the other fluid outlet channel 5a, which is arranged fluidically in parallel. Fluid fed in via the fluid inlet channel 4 consequently enters the switch-over body 2 via the fluid inlet 2a, flows through the body in the fluid duct 2c thereof to the fluid outlet 2b and, from there, enters the open fluid outlet channel 5b, while the other fluid outlet channel 5a is shut off.

By activating the actuation unit 3, in this case specifically by pressing the operating button 6, the user can switch over the switch-over body 2 into a new operating position. In this process, the actuation pin 3b initially pushes the switch-over body 2 forwards axially, i.e. in this case counter to the main direction of flow of the fluid, and the sliding guide 3c ensures the additional rotary movement of the switch-over body 2. Depending on the embodiment of the system, the new next operating position of the switch-over body 2 is rotated by 90° or by 180°, for which purpose the sliding guide 3c has merely to be designed accordingly. The rotary movement takes place only after the outlet surface 2f of the switch-over body 2 has risen axially from the valve seat surface of the outlet-side housing part 1b. In the embodiment with a respective rotation of 180°, a switch-over is made from the operating position shown with an open fluid outlet channel 5b and a closed fluid outlet channel 5a to the other operating position, in which the switch-over body 2 shuts off the fluid connection to the fluid outlet channel 5b and opens it to the fluid outlet channel 5a. In the embodiment with a respective rotation of 90°, there are, in addition to these two operating positions mentioned, two intermediate operating positions or rotational positions of the switch-over body 2, in which the body opens the fluid connection to both fluid outlet channels 5a, 5b since its fluid outlet 2b overlaps both fluid outlet channels 5a, 5b. In an alternative embodiment, the switch-over body 2 shuts off the fluid connection to both fluid outlet channels 5a, 5b in both intermediate rotational positions since its fluid outlet 2b does not overlap either of the two fluid outlet channels 5a, 5b. In this case, the fluid switch-over device consequently functions not only as a pure switch-over device but also as a shut-off member or shut-off valve.

The axial backward movement of the switch-over body 2 is brought about by an elastic bias element 19, which elastically biases the switch-over body 2 axially into its respective operating position. In the example shown in FIGS. 1 to 5, the elastic bias element 19 is implemented as a helical spring which is supported, on the one hand, on the switch-over body 2, for which purpose the body has an associated supporting shoulder at the transition from the inlet nozzle 2d to the foot part and, on the other hand, on the housing body 1, in this case specifically on the guiding sleeve 11.

As becomes clear from FIGS. 1 to 5 and the above description thereof, this fluid switch-over device allows switching over in a manner which is virtually independent of the fluid pressure while, at the same time, the fluid flow path from the fluid inlet channel 4 to the fluid outlet channels 5a, 5b has a configuration that is favorable in terms of flow. Along its entire course, the fluid duct 2c of the switch-over body 2 has a virtually constant effective flow cross section and a largely rectilinear flow duct which, for its part, is parallel to the longitudinal axis L of the switch-over body 2 and to the longitudinal axis $L_G$ of the tubular outer housing 1a, 1b. The flow is slightly deflected only in the curved section 2e of the fluid duct 2c, although the associated deflection angle remains less than 90° and, in corresponding embodiments, even significantly less, e.g. no more than 60° or no more than 45°.

With the exception of the face end edge of the inlet nozzle 2d at the fluid inlet 2a, the switch-over body 2 has no surface which is exposed to the fluid pressure in the fluid flow direction, as a result of which the mentioned large degree of independence of the switch-over operations from the fluid pressure is effected. For the axial lift-off of the switch-over body 2 from its respective operating position in contact with the valve seat surface of the outlet-side housing part 1b, no significant fluid pressure forces pushing the switch-over body 2 in the fluid flow direction have to be overcome, and the axial backward movement of the switch-over body 2 also remains very largely unaffected by the respectively prevailing fluid pressure and can therefore be controlled in the desired manner simply by an appropriate choice of the bias element 19. Thus, switch-over operations that are virtually independent of the fluid pressure and require only small actuation forces are made possible. The configuration of the fluid path in the fluid switch-over device in a manner favorable in terms of flow, with only small fluid deflections, furthermore minimizes the generation of noise by the fluid switch-over device, both during switch-over operations and in the respective operating position of the switch-over body 2. As furthermore becomes clear from the example in FIGS. 1 to 5, the fluid switch-over device according to the invention can be constructed in a compact and robust way and can be adapted in size to different uses, e.g. in sanitary shower devices and other sanitary water discharge faucets.

FIGS. 6 and 7 illustrate a variant of the fluid switch-over device in FIGS. 1 to 5, wherein, with the exception of the differences explained below, the fluid switch-over device shown in FIGS. 6 and 7 corresponds in its construction and its properties and advantages to the fluid switch-over device in FIGS. 1 to 5. The fluid switch-over device in FIGS. 6 and 7 is modified in relation to that in FIGS. 1 to 5 only in the configuration of the outlet surface 2f of the switch-over body 2.

More specifically, the fluid outlet 2b of the fluid switch-over device in FIGS. 6 and 7 is not formed by a circular outlet opening but is formed by a crescent- or half-ring-shaped outlet opening 17, i.e. the circular flow cross section of the inlet nozzle 2d merges at the end of the curved section 2e into the crescent/half-ring shape of the outlet opening 17, wherein an intermediate chamber can optionally be formed ahead of the outlet opening in the switch-over body. The embodiment with an intermediate chamber makes possible the intermediate operating or rotational position of the switch-over body 2, for example, in which both fluid outlet channels 5a, 5b are open. A circular sealing plate or sealing disc 18 is inserted into the outlet surface 2f of the switch-over body 2, opposite the outlet opening 17 in relation to the longitudinal axis L, the plate or disc being matched in size to the circular inlet cross section of each of the two fluid outlet channels 5a, 5b in order to cover this cross section in a fully fluid-tight manner in the corresponding position of the switch-over body 2.

The crescent/half-ring shape of the outlet opening 17 is configured in such a way that, in the operating position of the switch-over body 2 shown in FIG. 6, the body unblocks the fluid connection of its fluid outlet 2b to both fluid outlet channels 5a, 5b. In this regard, the position of the fluid outlet channels 5a, 5b, which are not actually visible in this view, is marked in dashed lines in FIG. 6. From this, it can be seen that the outlet opening 17 overlaps with the inlet cross sections of both fluid outlet channels 5a, 5b, i.e. unblocks the fluid connection to both fluid outlet channels 5a, 5b.

The abovementioned switch-over type with a respective 90° rotation of the switch-over body 2 from its instantaneous operating position into a subsequent operating position is preferably used for the fluid switch-over device in FIGS. 6 and 7. When the switch-over body 2 is switched over from its operating position shown in FIG. 6 into a subsequent operating position rotated by 90°, the outlet opening 17 unblocks the fluid connection to only one of the two fluid outlet channels 5a, 5b, e.g. to fluid outlet channel 5a, while the sealing disc 18 completely shuts off the fluid connection to the other of the two fluid outlet channels 5a, 5b, e.g. to fluid outlet channel 5b. As a result, fluid supplied then only enters one of the two fluid outlet channels 5a, 5b and no longer enters the other. If the switch-over body 2 is moved into its next operating position in the same direction of rotation, the outlet opening 17 once again overlaps both fluid outlet channels 5a, 5b, with the result that, as in the operating position of the switch-over body 2 in FIG. 6, fluid supplied is once again directed into both fluid outlet channels 5a, 5b. When the switch-over body 2 is once again switched into its next operating position rotated by 90°, one of the two fluid outlet channels 5a, 5b, e.g. outlet channel 5a, is completely shut off in a fluid-tight manner by the sealing disc 18, while the outlet opening 17 fully unblocks the fluid connection to the other of the two fluid outlet channels 5a, 5b, e.g. outlet channel 5b. As a result, fluid supplied then enters specifically only the other of the two fluid outlet channels 5a, 5b. By switching over the switch-over body 2 again with the same 90° direction of rotation, the switch-over body 2 once again moves into its operating position shown in FIG. 6 with fluid being supplied to both fluid outlet channels 5a, 5b.

FIGS. 8A to 8F illustrate the course of a switch-over operation for the fluid switch-over device embodiments shown in FIGS. 1 to 7 when the sliding guide 3c is designed for a 90° rotation of the switch-over body 2 in the context of such a switch-over operation. To make the sliding mechanism responsible for this more easily visible, the inlet-side housing part 1a has been removed, and the guiding sleeve 11 is shown partially cut away in these illustrations.

FIG. 8A shows the fluid switch-over device in the initial position, in which the switch-over body 2 is in one of its operating positions. When the user activates the actuation unit 3, in this case by pressing on the operating button 6, the actuation unit 3 initially pushes the switch-over body 2 axially forwards, as indicated in FIG. 8B by a translation arrow T and a translation travel t. In this case, the switch-over body 2 is guided axially by its sliding cam 9 in the axial groove 10a of the sliding guide 3c. The axial forward movement takes place against the return force of the elastic bias element 19. But there is no need to overcome any significant opposing fluid pressure since the switch-over body 2 does not have a corresponding surface to cause any significant pressure resistance, as explained above.

FIG. 8B shows the switch-over body 2 in an axially advanced position, in which it has not yet rotated and its sliding cam 9 comes to rest against the bevel surface cam 12a of the counter sliding element 12, more specifically against the bevel surface 12b thereof. In this position, the axial groove 10a still prevents rotation of the switch-over body 2. The switch-over body now pushes the counter sliding element 12 axially further backwards by a certain amount against the force of the spring 15, as symbolized by a translation arrow G.

Only when the sliding cam 9 of the switch-over body 2 has moved out of the axial groove 10a owing to the further forward axial movement of the body does the switch-over body 2 begin to rotate since the sliding cam 9 can now give way to the pressure force which is acting on it due to a circumferential direction component of the force exerted by the bevel surface cam 12a on the sliding cam 9, the force being applied by the spring 15 previously put under tension. This position of the switch-over body 2 is illustrated in FIG. 8C, wherein the rotation of the switch-over body 2 is symbolized by a rotation arrow D. In this way, the sliding cam 9 of the switch-over body 2 moves in the direction of rotation from the axial groove 10a to the adjoining bevel surface 10b owing to the action of the counter sliding element 12, which, with the bevel surface 12b of its bevel surface cam 12a, forms a transition for the sliding track 10 from the axial groove 10a to the bevel surface 10b adjoining in the direction of rotation.

As soon as the sliding cam 9 has reached the bevel surface 10b of the sliding track 10 in this way, the axial return force of the elastic bias element 19 on the switch-over body 2 has the effect that the sliding cam 9 slides along the bevel surface 10b of the sliding track, as a result of which the switch-over body 2 on the one hand continues its rotary movement and on the other hand is moved back axially in translation, as symbolized in FIG. 8D by a translation arrow T'. At the same time, the spring 15 pushes the counter sliding element 12 back into its initial position, as symbolized by a translation arrow G'. FIG. 8E shows the switch-over body 2 in a position in which its sliding cam 9 has almost arrived at the end of the bevel surface 10b of the sliding track 10, wherein another sliding cam 9 of, in this example, four sliding cams 9 each arranged offset by 90° in the circumferential direction on the inlet nozzle 2d of the switch-over body 2 can now be seen owing to the rotation of the switch-over body 2. The counter sliding element 12 has reassumed its initial position pushed back by the spring 15.

FIG. 8F shows the switch-over body 2 in the new operating position, in which it has been rotated by 90° relative to the initial position in FIG. 8A. The sliding cam 9 has moved from the bevel surface 10b into the next one of the, in this example, four axial grooves 10a of the sliding track 10, whereby the switch-over body 2 has moved back fully axially and is once again resting by its outlet surface 2f against the valve seat surface in the outlet-side housing part 1b of the fluid switch-over device.

Figure 9:
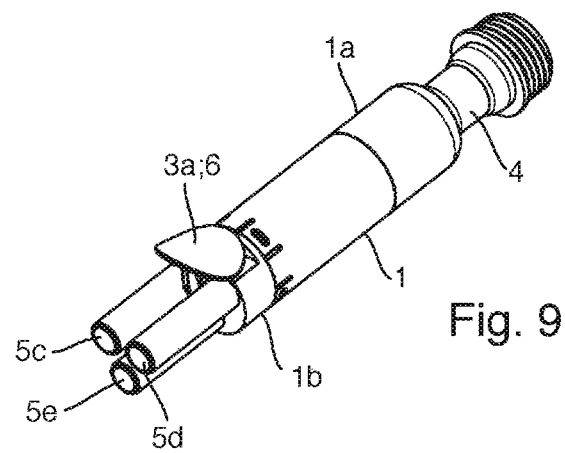
FIG. 9 shows a perspective view corresponding to FIG. 2 of a variant embodiment having three fluid outlet channels.
Figure 10:
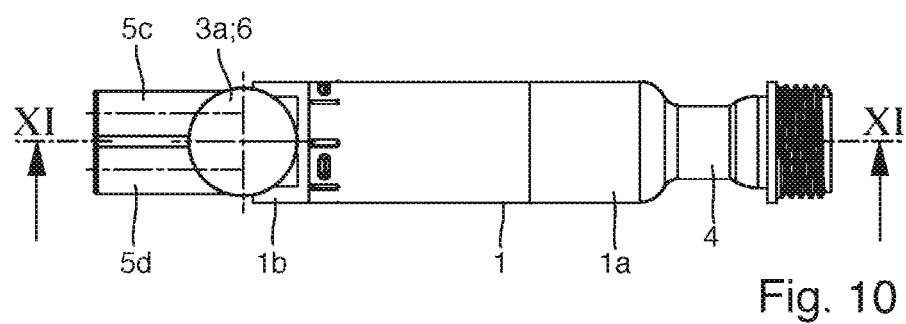
FIG. 10 shows a plan view of the fluid switch-over device in FIG. 9.
Figure 11:
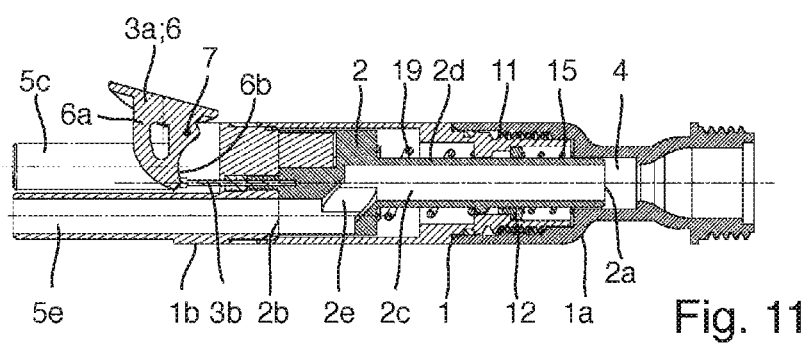
FIG. 11 shows a section along a line XI-XI in FIG. 10.

It is self-evident that the invention includes further advantageous embodiments of the kind which are readily apparent to a person skilled in the art. Thus, for example, FIGS. 9 to 11 illustrate an implementation of the fluid switch-over device according to the invention which corresponds to the embodiments mentioned above with the difference that, in this case, three fluid outlet channels 5c, 5d, 5e arranged fluidically in parallel are provided, the channels being arranged at an angular spacing of 120° in the circumferential direction of the tubular outer housing 1a, 1b. Desired fluid duct configurations can be achieved, depending on the embodiment of the fluid outlet 2b of the switch-over body and of the sliding guide for the rotated positioning of the switch-over body 2 between its various operating positions. In the embodiment shown in FIGS. 9 to 11, the switch-over body 2 with the offset outlet opening of circular cross section for the fluid outlet 2b in accordance with the illustrative embodiment in FIGS. 1 to 5 is used, and the sliding guide 3c is designed to rotate the switch-over body 2 by 120° in each case when it is switched to the next operating position. For this purpose, the switch-over body 2 can have three sliding cams arranged at an angular spacing of 120° on the circumference of the inlet nozzle 2d, for example, and, correspondingly, the sliding guide 3c then has three axial grooves 10a arranged offset in the circumferential direction and corresponding bevel surfaces 10b situated in between.

In this case, the switch-over body 2 then brings in each case one of the three fluid outlet channels 5c, 5d, 5e into fluid connection with the fluid inlet channel 4, while it keeps the two other outlet channels shut off in a fluid-tight manner. In alternative embodiments, the switch-over body 2 brings none of the three fluid outlet channels 5c, 5d, 5d or two of the three fluid outlet channels or all three into fluid connection with the fluid inlet channel 4 in corresponding operating positions. In other respects, the functions, properties and advantages explained above with reference to the embodiments in FIGS. 1 to 8F apply in the same way to the embodiment shown in FIGS. 9 to 11.

As the illustrative embodiments shown and mentioned above make clear, the invention makes available an advantageous fluid switch-over device which allows switching operations which are largely independent of the fluid pressure and which causes no troublesome flow noise. The fluid switch-over device can be constructed in a compact way and can be used in any environment in which there is a need for a fluid switch-over device of this kind. In particular, the switch-over device is suitable for installation in sanitary water discharge faucets, such as head, hand and side shower devices in shower rooms and bathtub systems and in kitchen spray attachments on kitchen sinks and in wash basin mixers.

Although the invention has been described in detail with reference to certain preferred embodiments, variations and modifications exist within the spirit and scope of the invention as described and defined in the following claims.

The invention claimed is:

1. A fluid switch-over device comprising
a housing body including a fluid inlet channel and a plurality of fluid outlet channels arranged fluidically in parallel;
a switch-over body including a fluid inlet, at least one fluid outlet and a fluid duct from the fluid inlet to the at least one fluid outlet, and is disposed within the housing body to be translationally movable axially parallel to a longitudinal axis and rotationally movable in relation to the longitudinal axis between at least two different operating positions, wherein the switch-over body in each of the different operating positions is in fluid connection to the fluid inlet channel via its fluid inlet and differentially unblocks or blocks at least partially a fluid connection of its at least one fluid outlet to the respective fluid outlet channel; and
an actuation unit for actuating the switch-over body, wherein the actuation unit comprises an operating element disposed on the housing body to be user-operable;
wherein the switch-over body comprises an inlet nozzle guided in a fluid-tight manner within the fluid inlet channel for axial and rotational movement, the inlet nozzle constituting the fluid inlet on an inlet side.

2. The fluid switch-over device according to claim 1, wherein the fluid inlet of the switch-over body has a passage cross section conforming to that of the fluid inlet channel.

3. The fluid switch-over device according to claim 1, wherein the switch-over body is rotatably movable about a central longitudinal axis of the inlet nozzle as a rotational axis, and the at least one fluid outlet is disposed offset in relation to the rotational axis.

4. The fluid switch-over device according to claim 1, wherein the actuation unit comprises an actuation pin guided within the housing body for axial movement and a sliding guide mechanism for rotating the switch-over body.

5. The fluid switch-over device according to claim 4, wherein the sliding guide mechanism comprises a sliding cam on the switch-over body and a sliding track on the housing body cooperating with the sliding cam.

6. The fluid switch-over device according to claim 5, wherein the sliding guide mechanism comprises a counter sliding element that is held elastically resilient, axially movable and rotationally fixed on the housing body, the counter sliding element having a beveled cam with a bevel surface constituting an initial section of the sliding track for the sliding cam.

7. The fluid switch-over device according to claim 4, wherein the sliding guide mechanism comprises a guiding sleeve of the housing body, with the inlet nozzle of the switch-over body passing through the sleeve, and the sleeve including an axial groove and a bevel surface adjoining thereto in rotational direction as component parts of the sliding track.

8. The fluid switch-over device according to claim 1, further comprising an elastic bias element to bias the switch-over body axially elastically in its respective operating position.

9. The fluid switch-over device according to claim 1, wherein the housing body is configured for installation into a sanitary water discharge faucet, including a shower handle or a shower head of a sanitary shower device.

10. The fluid switch-over device according to claim 1, configured for use with a sanitary water discharge faucet.

11. A fluid switch-over device comprising
a housing body including a fluid inlet channel and a plurality of fluid outlet channels arranged fluidically in parallel;
a switch-over body including a fluid inlet, at least one fluid outlet and a fluid duct from the fluid inlet to the at least one fluid outlet, and is disposed within the housing body to be translationally movable axially parallel to a longitudinal axis and rotationally movable in relation to the longitudinal axis between at least two different operating positions, wherein the switch-over body in each of the different operating positions is in fluid connection to the fluid inlet channel via its fluid inlet and differentially unblocks or blocks at least partially a fluid connection of its at least one fluid outlet to the respective fluid outlet channel; and
an actuation unit for actuating the switch-over body, wherein the actuation unit comprises an operating element disposed on the housing body to be user-operable;
wherein the actuation unit comprises an actuation pin guided within the housing body for axial movement and a sliding guide mechanism for rotating the switch-over body;
wherein the sliding guide mechanism comprises a sliding cam on the switch-over body and a sliding track on the housing body cooperating with the sliding cam;
wherein the sliding guide mechanism comprises a counter sliding element that is held elastically resilient, axially movable and rotationally fixed on the housing body, the counter sliding element having a beveled cam with a bevel surface constituting an initial section of the sliding track for the sliding cam.

12. The fluid switch-over device according to claim 11, wherein the sliding guide mechanism comprises a guiding sleeve of the housing body, with the inlet nozzle of the switch-over body passing through the sleeve, and the sleeve including an axial groove and a bevel surface adjoining thereto in rotational direction as component parts of the sliding track.

13. The fluid switch-over device according to claim 12, wherein the switch-over body comprises an inlet nozzle guided in a fluid-tight manner within the fluid inlet channel for axial and rotational movement, the inlet nozzle constituting the fluid inlet on an inlet side.

14. The fluid switch-over device of claim 11, wherein the fluid inlet of the switch-over body has a passage cross section conforming to that of the fluid inlet channel.

15. The fluid switch-over device according to claim 11, wherein the switch-over body is rotatably movable about a central longitudinal axis of the inlet nozzle as a rotational axis, and the at least one fluid outlet is disposed offset in relation to the rotational axis.

16. The fluid switch-over device according to claim 11, further comprising an elastic bias element to bias the switch-over body axially elastically in its respective operating position.

17. A fluid switch-over device comprising
a housing body including a fluid inlet channel and a plurality of fluid outlet channels arranged fluidically in parallel;
a switch-over body including a fluid inlet, at least one fluid outlet and a fluid duct from the fluid inlet to the at least one fluid outlet, and is disposed within the housing body to be translationally movable axially parallel to a longitudinal axis and rotationally movable in relation to the longitudinal axis between at least two different operating positions, wherein the switch-over body in each of the different operating positions is in fluid connection to the fluid inlet channel via its fluid inlet and differentially unblocks or blocks at least partially a fluid connection of its at least one fluid outlet to the respective fluid outlet channel; and
an actuation unit for actuating the switch-over body, wherein the actuation unit comprises an operating element disposed on the housing body to be user-operable;
wherein:
the housing body comprises a tubular outer housing,
the operating element includes an operating button pivotable about a pivot axis extending transversely in relation to a longitudinal axis of the tubular outer housing; and
the switch-over body comprises an inlet nozzle guided in a fluid-tight manner within the fluid inlet channel for axial and rotational movement, the inlet nozzle constituting the fluid inlet on an inlet side.

18. The fluid switch-over device according to claim 17, wherein the switch-over body is rotatably movable about a central longitudinal axis of the inlet nozzle as a rotational axis, and the at least one fluid outlet is disposed offset in relation to the rotational axis.

19. The fluid switch-over device according to claim 17, wherein the actuation unit comprises an actuation pin guided within the housing body for axial movement and a sliding guide mechanism for rotating the switch-over body.

* * * * *